UNITED STATES PATENT OFFICE.

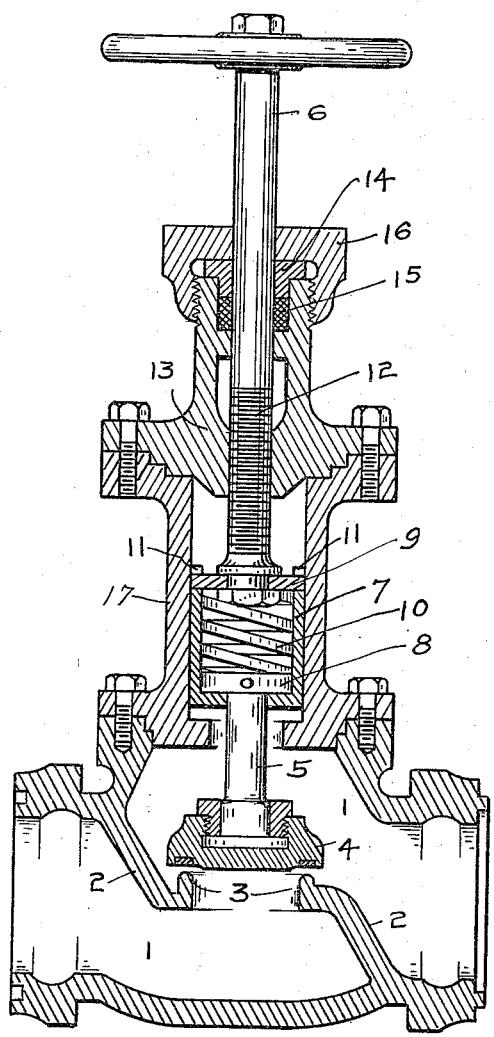

PERRY LOSH, OF MUNCIE, INDIANA.

COMBINED STOP AND RELIEF VALVE.

1,146,723. Specification of Letters Patent. Patented July 13, 1915.

Application filed July 3, 1914. Serial No. 848,841.

*To all whom it may concern:*

Be it known that I, PERRY LOSH, a citizen of the United States, residing at Muncie, in the county of Delaware and State of Indiana, have invented certain new and useful Improvements in Combined Stop and Relief Valves, of which the following is a specification.

This invention relates to improvements in combined stop and relief valves which will stop the flow under normal predetermined pressure through a pipe equipped with it, but will open in the direction of discharge when a dangerous pressure or shock occurs, and while the device is particularly designed for ammonia refrigerating plants it is applicable to a variety of other uses.

The object of the invention is to provide a simple, durable, compact and inexpensive valve which can be installed in any space where the usual stop valve could be accommodated.

I accomplish the above and other objects which will hereinafter appear by the mechanism illustrated in the accompanying drawing, which is a central section taken longitudinally of the valve-stem.

1 is a chamber in the pipe line to be controlled and is divided by a partition 2 into two compartments having communication through a valve-seat 3.

4 is a valve of any suitable and usual construction, mounted on a valve-stem by which it is seated and unseated by a corresponding longitudinal movement of the valve-stem. The valve-stem is in two transversely divided parts 5 and 6. The inner end of the inner member 5 is connected in the usual manner with the valve 4, and secured to the inner end of the outer member 6 is a cylinder 7 with heads at both ends. The cylinder 7 makes a sliding fit in a corresponding bore of the housing 17. The inner rod member 5 passes through a central opening in the inner end of the cylinder 7 and terminates with a piston head 8 which has reciprocating movement within said cylinder. The outer rod member 6 has its inner end swivelly connected to the outer head 9 of the cylinder 7. Located within the cylinder 7 between the piston 8 and head 9 is a spirally wound spring 10. The outer cylinder head 9 is removable from the cylinder to permit the assembly of parts 8 and 10 within the cylinder, and said head 9 is secured to the cylinder by bolts 11.

The outer rod member 6 has the screw-threaded portion 12 to engage the correspondingly threaded hole in the outer stem housing 13, and is the means by which a longitudinal movement is imparted to the valve-stem as a whole to seat and unseat the valve. The housing 13 has the usual gland 14, packing 15 and cap 16 screwing on the outer end of said member, to pack the valve member 6 so as to prevent leakage around it.

The resistance of the spring 10 is such as to yield and permit of the unseating of the valve 4 when the pressure in the direction of flow through the pipe exceeds this prearranged spring resistance. The valve will thus automatically open and afford relief for the excess pressure whenever conditions requiring it arise.

While I have described my invention with more or less minuteness as regards details of construction and arrangement and as being embodied in certain precise forms, I do not desire to be limited thereto unduly or any more than is pointed out in the claims. On the contrary, I contemplate all proper changes in form, construction, and arrangement, the omission of immaterial elements, and the substitution of equivalents, as circumstances may suggest or necessity render expedient.

I claim:—

1. In a combined stop and relief valve, the combination with a conduit, a cross partition with an opening surrounded by a valve-seat, a valve coöperating with said seat, a valve stem housing, a valve-stem in two transversely divided members, the outer one of which is screw-threaded into a member of the stem housing, a cylinder swivelly connected with said outer one of said members and making a sliding fit in a bore of a member of the stem-housing, a piston in said cylinder connected with the inner of said stem members, and a spring in the cylinder to normally hold the piston at an end of the cylinder.

2. In a combined stop and relief valve, the combination with a conduit having a transverse partition with an opening, a valve-seat flange surrounding said opening, a valve coöperating with said seat flange, a valve-stem in two transversely divided members, the outer one of which is screw-threaded, a stem housing in which the threaded member of the stem is screwed, hand means for rotating the threaded stem member, a valve swivelly connected to the inner end of the inner stem member, a cylinder headed at both ends assembled with a close sliding fit in a bore of the stem-housing between the two stem members and swivelly connected with the outer stem member, a piston in the cylinder fastened to the lower stem member, and a spirally wound spring in the cylinder between the piston and the outer piston head.

In witness whereof, I, have hereunto set my hand and seal at Indianapolis, Indiana, this 30th day of June, A. D. one thousand nine hundred and fourteen.

PERRY LOSH. [L. S.]

Witnesses:
F. W. WOERNER,
I. L. LARSON.

Copies of this patent may be obtained for five cents each, by addressing the "Commissioner of Patents, Washington, D. C."